(12) United States Patent
Huang et al.

(10) Patent No.: US 12,092,404 B2
(45) Date of Patent: Sep. 17, 2024

(54) HEAT EXCHANGER, PROCESSING METHOD OF HEAT EXCHANGER AND COMPOSITE MATERIAL

(71) Applicant: Hangzhou Sanhua Research Institute Co., Ltd., Zhejiang (CN)

(72) Inventors: Hai Huang, Zhejiang (CN); Jianhua Tang, Zhejiang (CN); Shurui Yu, Zhejiang (CN); Ming Xue, Zhejiang (CN); Linjie Huang, Zhejiang (CN)

(73) Assignee: Hangzhou Sanhua Research Institute Co., Ltd., Zhejiang (CN)

( * ) Notice: Subject to any disclaimer, the term of this patent is extended or adjusted under 35 U.S.C. 154(b) by 5 days.

(21) Appl. No.: 17/965,674

(22) Filed: Oct. 13, 2022

(65) Prior Publication Data
US 2023/0139955 A1 May 4, 2023

(30) Foreign Application Priority Data
Oct. 14, 2021 (CN) .......................... 202111198605.2

(51) Int. Cl.
*F28F 21/08* (2006.01)
(52) U.S. Cl.
CPC .................. *F28F 21/089* (2013.01)
(58) Field of Classification Search
CPC ........... F28F 21/089; F28F 1/022; F28F 1/128
See application file for complete search history.

(56) References Cited

U.S. PATENT DOCUMENTS

| | | | |
|---|---|---|---|
| 2007/0137835 A1* | 6/2007 | Chew Wang | H01L 24/32 165/80.2 |
| 2021/0116189 A1* | 4/2021 | Zhou | F28F 13/18 |
| 2021/0156622 A1* | 5/2021 | Jiang | F28F 1/022 |
| 2022/0355567 A1* | 11/2022 | Hebrink | B32B 27/308 |

FOREIGN PATENT DOCUMENTS

| | | | | |
|---|---|---|---|---|
| EP | 3187271 A1 * | 7/2017 | | B05D 5/00 |
| JP | 2021103059 A * | 7/2021 | | |

* cited by examiner

*Primary Examiner* — Devon Russell
(74) *Attorney, Agent, or Firm* — Knobbe Martens Olson & Bear LLP (57) ABSTRACT

A heat exchanger, a processing method of a heat exchanger and a composite material, wherein the heat exchanger includes a collecting pipe, a fin and a number of heat exchange tubes. Each of the heat exchange tubes is fixed to the collecting pipe, and an inner cavity of the heat exchange tube is communicated with an inner cavity of the collecting pipe. The fin is retained between two adjacent heat exchange tubes. The heat exchanger further includes a coating layer which is coated on an outer surface of at least one of the collecting pipe, the heat exchange tube and the fin. The coating layer includes micro-nano particles and a polymer obtained by polymerizing monomers including allylic monomers with hydrophilic groups. The micro-nano particles include silicon dioxide and/or titanium dioxide. The coating layer of the heat exchanger has excellent hydrophilic durability.

20 Claims, 4 Drawing Sheets

HEAT EXCHANGER, PROCESSING METHOD OF HEAT EXCHANGER AND COMPOSITE MATERIAL

CROSS-REFERENCE TO RELATED APPLICATIONS

The present application claims priority to Chinese Patent Application No. 202111198605.2, filed on Oct. 14, 2021, the disclosure of which is incorporated herein by reference in its entirety.

TECHNICAL FIELD

The present disclosure relates to the technical field of heat exchange and materials and in particular, to a heat exchanger, a processing method of a heat exchanger and a composite material.

BACKGROUND

In the related art, in order to improve drainage performance of a surface of a heat exchanger, the surface of the heat exchanger is usually coated with a hydrophilic coating in some technical solutions. However, the hydrophilic coating in the related art has poor hydrophilic durability and is still difficult to meet the requirements in practical applications. The hydrophilic durability of coating materials remains to be improved.

SUMMARY

The present disclosure aims to provide a heat exchanger, a processing method of a heat exchanger and a composite material. The heat exchanger has a coating layer with fine hydrophilic durability. The processing method of the heat exchanger can be used to provide a heat exchanger with fine hydrophilic durability by forming a coating layer thereon. The composite material can be used to forming a coating layer with excellent hydrophilic durability on the surface of an object.

The first aspect of the present disclosure provides a heat exchanger including a collecting pipe, a fin, a plurality of heat exchange tubes and a coating layer, where the heat exchange tubes are fixed to the collecting pipe, an inner cavity of the heat exchange tube is communicated with an inner cavity of the collecting pipe, at least part of the fin is retained between two adjacent heat exchange tubes, and the coating layer is coated on at least part of an outer surface of at least one of the collecting pipe, the heat exchange tube and the fin, where the coating layer includes micro-nano particles and a polymer obtained by polymerizing monomers, the micro-nano particles include silicon dioxide and/or titanium dioxide, and the monomers corresponding to the polymer include allylic monomers with hydrophilic groups.

The coating layer of the heat exchanger of the present disclosure includes micro-nano particles and a polymer obtained by polymerizing monomers. The micro-nano particles are favorable to form a complex micro-nano structure. The polymer obtained by polymerizing monomers can increase the compactness of the coating layer, and improve the wear resistance of the coating layer. The hydrophilic durability of the coating layer can be improved by cooperating the polymer with the micro-nano particles.

The second aspect of the present disclosure provides a processing method of a heat exchanger, including:
providing a composite material and a heat exchanger, where the composite material includes micro-nano particles and a polymer obtained by polymerizing monomers, the micro-nano particles include silicon dioxide and/or titanium dioxide, and the monomers corresponding to the polymer include allylic monomers with hydrophilic groups: and the heat exchanger includes a collecting pipe, a fin and a plurality of heat exchange tubes, the heat exchange tube is fixed to the collecting pipe, an inner cavity of the heat exchange tube is communicated with an inner cavity of the collecting pipe, and at least part of the fin is retained between two adjacent heat exchange tubes: and
coating the composite material on at least a part of an outer surface of at least one of the collecting pipe, the heat exchange tube and the fin, and curing the composite material.

In the processing method of the heat exchanger according to the present disclosure, the composite material and the heat exchanger are provided, and the composite material is coated on at least part of the outer surface of the heat exchanger and cured. Since the composite material includes micro-nano particles and the polymer obtained by polymerizing monomers, where the micro-nano particles are favorable to form a complex micro-nano structure, and the polymer obtained by polymerizing monomers can increase the compactness and the wear resistance of the coating layer, the processing method of the heat exchanger is favorable to provide the heat exchanger having a coating layer with fine hydrophilic durability by cooperating the polymer with the micro-nano particles.

The third aspect of the present disclosure further provides a composite material including micro-nano particles and a polymer obtained by polymerizing monomers, where the micro-nano particles include silicon dioxide and/or titanium dioxide, and the monomers corresponding to the polymer include allylic monomers with hydrophilic groups.

The composite material includes the micro-nano particles and the polymer obtained by polymerizing monomers, where the micro-nano particles are favorable to form a complex micro-nano structure, and the polymer obtained by polymerizing monomers can increase the compactness and the wear resistance of the coating layer. Therefore, the composite material according to the present disclosure is favorable to form a coating layer with excellent hydrophilic durability on the surface of an object by synergistic cooperation of the abovementioned polymer and micro-nano particles.

Additional aspects and advantages of the present disclosure will be set forth in part from the following description, and will be apparent in part from the following description, or will be learned from practice of the present disclosure.

DESCRIPTION OF EMBODIMENTS

In order to understand the technical solution of the present disclosure better, embodiments of the present disclosure will be described in detail below with reference to the drawings.

It should be clear that the described embodiments are only part of the embodiments of the present disclosure, but not all of the embodiments. Based on the embodiments of the present disclosure, all other embodiments obtained by those skilled in the art without any creative effort fall within the protection scope of the present disclosure.

The terms used in the embodiments of the present disclosure are only for the purpose of describing specific embodiments, but not intended to limit the present disclosure. As used in the embodiments and the attached claims of the present disclosure, the terms "a", "said" and "the" in singular form are also intended to include various forms, unless the context clearly represents other meanings.

It should be understood that the term "and/or" used in the present disclosure is only an association relationship to describe associated objects, which represents that there may be three kinds of relationships. For example, A and/or B may represents the following three cases: A exists alone, A and B exist at the same time, and B exists alone. In addition, the character "/" of the present disclosure generally represents that the previous and the following associated objects are in an "or" relationship.

In the related art, there are some technologies for hydrophilizing a surface of a heat exchanger. At present, the hydrophilic processing for the surface of the heat exchanger is mainly realized by coating the surface with a hydrophilic coating material to form a coating layer (a hydrophilic coating film). For example, the hydrophilic coating material is coated on the surface of the heat exchanger to form the hydrophilic coating film, so that droplets promptly spread and flow away on the surface of the coating layer, and the droplets do not tend to bridge and cause problems such as frosting and secondary frosting. Although some hydrophilic coating materials in the related art have excellent film-forming ability and leveling property, the formed coating layer has poor durability. The hydrophilicity of the coating layer deteriorates, and even worse, the entire coating layer falls out, particularly after being used for a period. Therefore, it is difficult for the heat exchanger to meet practical application requirements. Therefore, how to provide the heat exchanger with better drainage performance and how to develop a material with sustainable and durable hydrophilic ability become problems to be urgently solved in relevant industries Based on the above, the technical solutions according to the embodiments of the present disclosure provide a heat exchanger, a processing method of a heat exchanger and a composite material. Regarding the processing method of the heat exchanger, the present disclosure further provides a preparing method of the composite material for forming a coating layer. The heat exchanger provided by the technical solutions according to the embodiments of the present disclosure has a coating layer with excellent hydrophilic durability. The coating layer has better durability while ensuring its hydrophilicity, and can increase service life of the heat exchanger. The specific technical solutions are described below.

In the present disclosure, percentage, proportion or parts referred are counted by mass unless stated otherwise. The term "part by mass" refers to a basic measurement unit of mass ratio relationship of multiple components, and 1 part by mass may represent any unit mass, for example, 1 g, 1.68 g, or 5 g.

Figure 1:
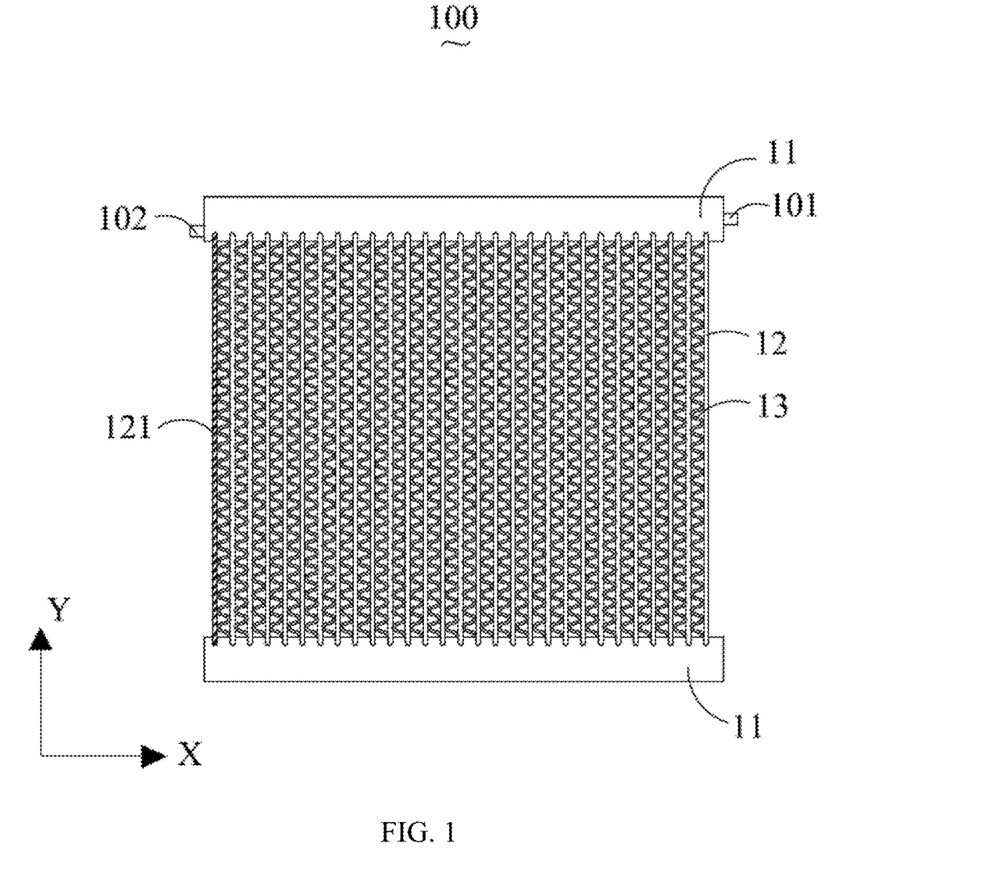
FIG. 1 is a structural schematic diagram of a heat exchanger according to an embodiment of the present disclosure.

As shown in FIG. 1, the heat exchanger 100 includes two collecting pipes 11, a plurality of heat exchange tubes 12 and a plurality of fins 13. In the heat exchanger 100, the plurality of heat exchange tubes 12 are all fixed to the collecting pipe 11. Multiple channels for flowing refrigerant are provided at the heat exchanger tube 12, and the multiple channels at the heat exchanger tube 12 are all communicated with an inner cavity of the collecting pipe 11. The fin 13 is located between two adjacent heat exchange tubes 12. The collecting pipe 11 is provided with a fluid inlet 101 and a fluid outlet 102 which are communicated with the inner cavity thereof, so as to facilitate fluid to enter the heat exchanger.

Figure 2:
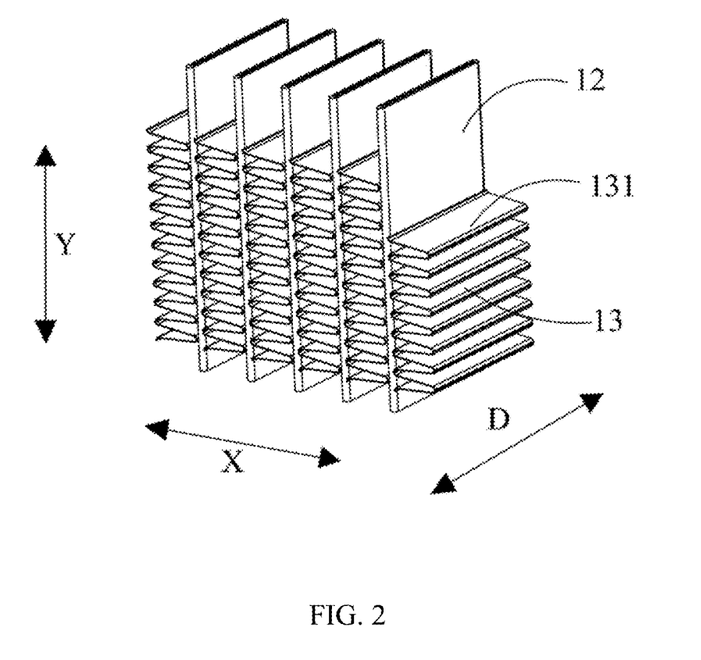
FIG. 2 is an enlarged schematic diagram of an assembly structure of part of components of the heat exchanger in FIG. 1.

The plurality of heat exchange tubes 12 are arranged along a length direction of the collecting pipe 11, and the length direction of the collecting pipe 11 may refer to X direction in FIG. 1. The heat exchange tube 12 has a tubular structure extending longitudinally. A length direction of the heat exchange tube 12 may refer to Y direction in FIG. 1, and a width direction of the heat exchange tube 12 may refer to D direction in FIG. 2. The dimension in the width direction of the heat exchange tube 12 is greater than that in a thickness direction thereof, and the thickness direction of the heat exchange tube 12 substantially coincides with the length direction of the collecting pipe 11. In addition, the width direction of the heat exchange tube 12 and the length direction of the collecting pipes 11 are not co-directional. In FIG. 2, the width direction (the D direction) of the heat exchange tube 12 is substantially perpendicular to the length direction (the X direction) of the collecting pipe 11.

As shown in FIG. 1, and both ends of the heat exchange tubes 12 in the length direction are inserted into the inner cavities of the two collecting pipes 11, respectively. The type of the heat exchanger is often referred to as a single row heat exchanger in the industry. In some other embodiments, the number of the collecting pipes 11 may be one or more than two. Correspondingly, the number of the heat exchange tubes and the fins may also be set according to the actual product requirements.

In some embodiments, referring to FIG. 2, the fin 13 has a waveform structure extending along the length direction (the Y direction) of the heat exchange tube 12. The fin 13 includes a plurality of fin units 131 arranged along the length direction of the heat exchange tube 12, and the plurality of fin units 131 are sequentially connected to each other along the length direction of the heat exchange tube 12. A wave crest or a wave trough in the waveform structure corresponding to the fin 13 is formed, and the fin 13 is fixed to the heat exchange tube 12 at a location where two adjacent fin units 131 are connected to each other. During assembly, the collecting pipe 11, the fin 13, the heat exchange tube 12 and other components can be assembled together in advance, the collecting pipe 11 and the heat exchange tube 12 are fixed by brazing, and the fins 13 are retained between two adjacent heat exchange tubes 12.

The heat exchanger 100 further includes a coating layer 121 coated on at least part of an outer surface of at least one of the collecting pipe 11, the heat exchange tube 12 and the fin 13. FIG. 1 illustrates the coating layer 121 by a shaded portion on the surface of the leftmost heat exchange tube 12 of the plurality of the heat exchange tubes 12.

In some embodiments of the present disclosure, the coating layer 121 includes micro-nano particles and a polymer obtained by polymerizing monomers.

In some embodiments, the micro-nano particles include at least one of silicon dioxide modified by hydrophilic groups, and titanium dioxide modified by hydrophilic groups. In some embodiments, the micro-nano particles include both silica particles modified by hydrophilic groups and titanium dioxide particles modified by hydrophilic groups. The content of silica particles is greater than that of titanium dioxide particles.

The silica particles and the titanium dioxide particles in the coating layer 121 can cooperate with each other to form a complex micro-nano structure. On the basis, the polymer obtained by polymerizing monomers contained in the coating layer 121 can improve the compactness of the micro-nano structure, so as to provide the compactness and wear resistance of the coating layer 121 to a certain extent.

The polymer according to the embodiments of the present disclosure is formed by polymerizing at least one monomer. A monomer is a general designation for small molecules that can polymerize with the same or other molecules. The monomer is a simple compound that can form high molecular compounds by polymerization or polycondensation. Further, the monomer is also raw material of low molecular for synthesizing polymer. The above monomer may be a monomer including double bonds or triple bonds. This type of monomer may polymerize with other monomers through double bonds or triple bonds thereof. For example, the monomer may be an allylic monomer with a hydrophilic group. The hydrophilic group of the monomer can complement the hydrophilic group configured to modify the micro-nano particles after forming the polymer, so as to improve the hydrophilicity of the final coating layer. The hydrophilic group contained in the monomer may be hydrophilic groups, such as hydroxyl group (—OH), aldehyde group (—CHO), carboxyl group (—COOH), amino group (—NH$_2$), sulfonic acid group (—SO$_3$H), phosphoric acid group, sulfuric acid group, amide group and quaternary ammonium group.

In the embodiments of the present disclosure, the allylic monomer may be a monomer containing unsaturated double bonds, such as hydroxyethyl methacrylate, methacrylic acid, methyl methacrylate, methyl acrylate, butyl acrylate, hydroxypropyl acrylate, methacrylamide, acrylamide and N-methacrylamide.

The above polymer can be formed by polymerization of one kind of monomers or polymerization of different kinds of monomers. An initiator can be added during the polymerization process to initiate a polymerization reaction between two monomers.

In some embodiments of the present disclosure, the polymer is mainly hydroxyethyl methacrylate polymer formed by polymerization of hydroxyethyl methacrylate monomers. It should be noted that the coating layer 121 may further include hydroxyethyl methacrylate if hydroxyethyl methacrylate monomers are not sufficiently polymerized.

In some embodiments, the weight per unit area of the coating layer 121 is controlled at 15 g/m$^2$~20 g/m$^2$.

In some embodiments, the coating layer 121 further includes at least one of polyvinyl alcohol and polyethylene glycol, such as polyvinyl alcohol as a coating component, which is favorable to improve strength and durability of the film layer.

Figure 3:
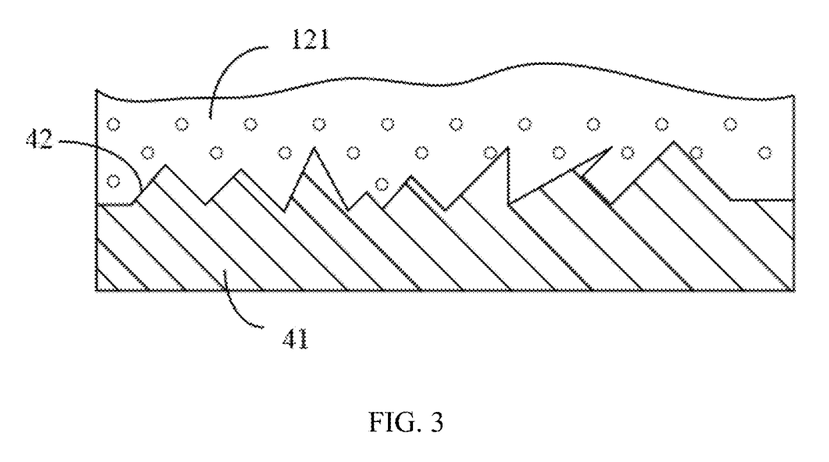
FIG. 3 is a schematic diagram showing a combination of a metal substrate and a coating according to an embodiment of the present disclosure.

As shown in FIG. 3, in some embodiments, the material of a metal substrate 41 corresponding to any one of the collecting pipe 11, the fin 13 and the heat exchange tube 12 includes at least one of aluminum, cooper and stainless steel.

For example, the collecting pipe 11, the fin 13 and the heat exchange tube 12 are all aluminous components. In an embodiment, an outer surface of the above metal substrate 41 includes an uneven rough surface 42 with a roughness of 0.5 μm~10 μm. In the present disclosure, a roughness is defined as Ra. In some embodiments, the roughness of the rough surface 42 of the metal substrate is 1 μm~3 μm. In an embodiment, the roughness of the rough surface 42 of the above metal substrate may be 1 μm, 1.2 μm, 1.4 μm, 1.6 μm, 1.8 μm, 2.0 μm, 2.2 μm, 2.4 μm, 2.6 μm, 2.8 μm, 3 μm, etc., but it is not limited to the listed values. Other values not listed in the numerical range are also available.

The rough surface 42 of the above-mentioned metal substrate 41 can be obtained by sandblasting the heat exchanger 100. Controlling the roughness of the surface of the metal substrate is favorable for the metal substrate to combine with other coating materials subsequently, to have excellent durability. Although a greater roughness is favorable for the adhesion of subsequent coating layer, too great roughness, for example, more than 10 μm, will lead to a relatively large deformation of the metal substrate, and thus a relatively great thickness of the metal substrate is required, otherwise it is easy to damage the metal substrate. Too less roughness will lead to non-obvious improvement of the durability of the coating layer. In an embodiment, at least part of the coating layer 121 is coated on the rough surface 42.

The embodiments of the present disclosure further provides a processing method of the heat exchanger which includes the following steps:

providing a composite material and a heat exchanger, where the composite material provided includes micro-nano particles and a polymer obtained by polymerizing monomers, the micro-nano particles include at least one of silicon dioxide and titanium dioxide, and the monomers corresponding to the polymer include allylic monomers with hydrophilic groups: and the heat exchanger provided includes a collecting pipe, a fin and a plurality of heat exchange tubes, the heat exchange tubes are fixed to the collecting pipe, an inner cavity of the heat exchange tube is communicated with an inner cavity of the collecting pipe, and at least part of the fin is fixed between two adjacent heat exchange tubes; and coating the composite material on at least part of a surface of at least one of the collecting pipe, the heat exchange tube and the fin, curing the composite material, to obtain a heat exchanger with a coating layer.

Figure 4:
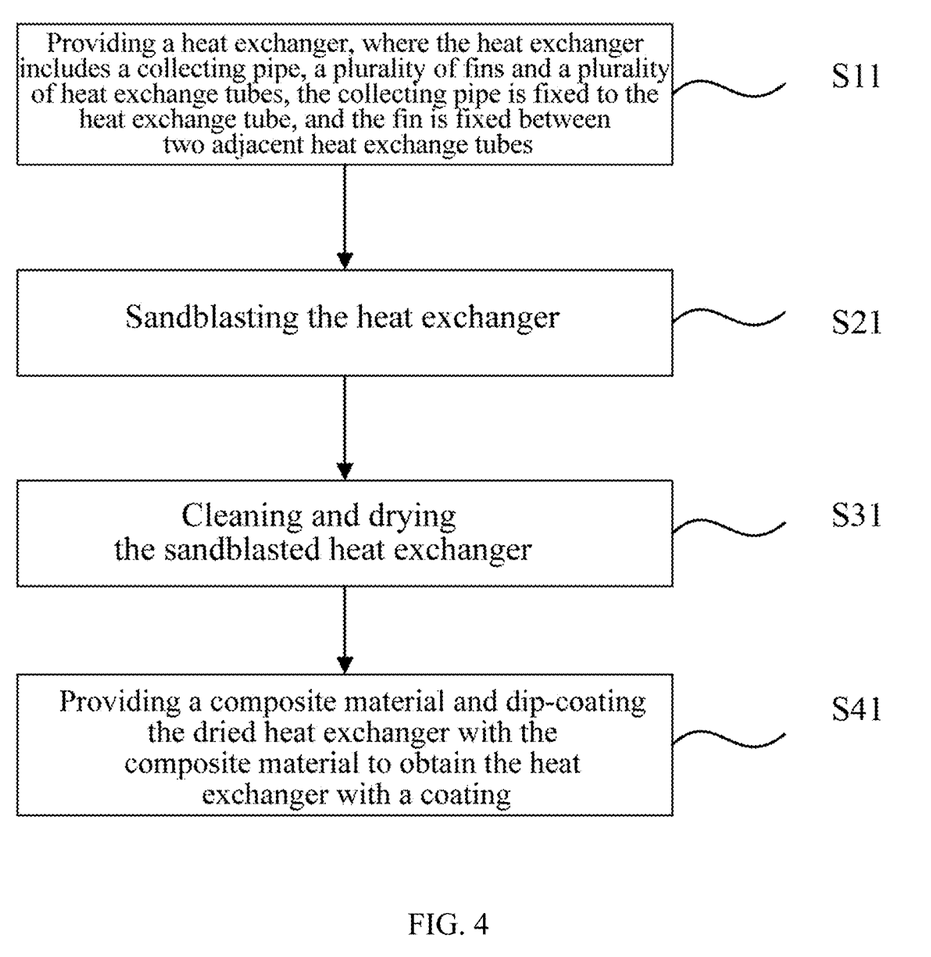
FIG. 4 is a flowchart of a processing method of a heat exchanger according to an embodiment of the present disclosure.

As shown in FIG. 4, the above heat exchanger with a coating layer can be obtained by the following steps:

Step S11, providing a heat exchanger, where the heat exchanger includes a collecting pipe, a plurality of fins and a plurality of heat exchange tubes, the collecting pipe is fixed to the heat exchange tube, and the fin is fixed between two adjacent heat exchange tubes;

Step S21, sandblasting the heat exchanger, where sandblasted heat exchanger satisfies that an uneven rough surface is formed on at least part of the outer surface of the metal substrate corresponding to at least one of the collecting pipe, the fin and the heat exchange tube:

Step S31, cleaning and drying the sandblasted heat exchanger; and

Step S41, providing a composite material, and dip-coating the dried heat exchanger with the composite material, to obtain the heat exchanger with a coating layer.

The collecting pipe, the fin and the heat exchange tube may be welded by brazing. That is, these components are welded into a whole by brazing. The brazing process is favorable to achieve sealability of positions where the above components are connected. However, a brazing flux will be left on the outer surface of the metal substrate of the collecting pipe, the fin and the heat exchange tube during the brazing process. As being limited by its own material properties, the brazing flux including an inorganic material has poor adhesion, and is difficult to combine with the coating material. In practical application, the brazing flux as such is easy to desquamate from the heat exchanger, so that the coating layer at the location where the brazing flux remains is difficult to be maintained for a long time. In addition, since the metal substrate of each component of the heat exchanger is exposed to the air for a long time, an oxide layer will be formed, which is also unfavorable to combine with some types of coating materials. Therefore, the surface of the heat exchanger needs to be treated before coating, to remove the residual brazing flux, oxide, oil stain and other contaminants on the surface, and to contrast a certain rough surface structure for adhering the coating layer.

In step S21, said sandblasting the heat exchanger specifically includes the following steps: sandblasting the surface of the heat exchanger 1~3 times by abrasives with particle size between 30 meshes and 280 meshes. The abrasives are gravels made of corundum material. In some embodiments, the particle size of abrasives is 120~180 meshes, such as 150 meshes.

The advantages of the sandblasting in the above step S21 are as follows. In the first aspect, a large amount of residual brazing flux, oxide layer, oil stain, or the like on the surface of the metal substrate can be removed, to obtain a relatively clean surface of the metal substrate. In the second aspect, a better micro-rough surface structure on the surface of the metal substrate is formed by the sandblasting and polishing of the abrasive, which increases the subsequent bonding force with other coating materials, and facilitates the leveling and decoration of the coating material. In the third aspect, cutting and impact produced by the sandblasting strengthen the mechanical properties of the surface of the metal substrate and improve the fatigue resistance of the metal substrate. In the fourth aspect, the sandblasting can remove irregular structures such as burrs on the surface of the metal substrate, and create very small rounded corners on the surface of the metal substrate, especially on the junction where the various components are connected, so that the surface of the metal substrate is more flat and beautiful, which is favorable for subsequent processing. The surface structure and morphology of the metal substrate has been changed after sandblasting, and metal grains are finer and denser. More hydroxyl groups are formed on the surface of the metal substrate after sandblasting. During the process of connecting with the hydrophilic coating layer, the hydrophilic coating and the metal substrate can be connected by covalent bonds through dehydration condensation between the hydroxyl groups of the hydrophilic coating layer and the hydroxyl groups of the metal substrate. The connection mode of covalent bonds is relatively stable, which is favorable to improve the durability of the connection between the metal substrate and the hydrophilic coating layer.

In other embodiments, the surface of the heat exchanger can also be constructed with a certain roughness through chemical processing, such as acid washing or alkali washing, and the excess adhesion on the surface of the metal substrate can be removed by chemical reaction of a solvent, such as acid and alkali as cleaning agent, with metal oxides, brazing fluxes, etc. However, the cost of the method is high, the process is relatively complicated, and there are certain risks in the cleaning process.

In step S31, the step of performing ultrasonic cleaning to the sandblasted heat exchanger after sandblasting includes the following steps: performing ultrasonic cleaning to the sandblasted heat exchanger with at least one of deionized water, ethanol, and absolute ethanol. The duration of the ultrasonic cleaning is 5 min~10 min, and the ultrasonic frequency of the ultrasonic cleaning is 80 Hz~100 Hz.

It should be noted that the composite material in the step S41 is not equivalent to the coating layer. After the composite material is coated on at least part of the surface of at least one of the collecting pipe, the heat exchange tube and the fin, the whole structure needs to be cured at a high temperature. During the high temperature curing process, the aqueous solvent in the composite material will volatilize according to the temperature, and the groups carried by silica particles, titanium dioxide particles, etc. will perform dehydration condensation with some groups on the surface of the aluminum material of the heat exchanger, and thereby form a stable chemical chain structure. The heat exchanger product with a coating layer can be finally obtained after curing. In the embodiments of the present disclosure, the way to coat the composite material on the heat exchanger includes but is not limited to at least one of dip-coating, spray coating, brush coating, shower coating and roller coating. Considering the convenience of implementation, the composite material according to the embodiments of the present disclosure can be coated on the surface of the heat exchanger by spray coating or dip-coating. The duration of dip-coating is 2~5 min, and further optional 2~3 min. The number of dip-coating is 1~5 times, and further optional 2~3 times. The duration of high temperature curing is longer than 10 min after the dip-coating is completed. The temperature of the curing is 180° °C.~220° °C., and further optional 190° C.~210° C., and further optional 200° C. The curing time is 0.5 h~2 h, and further optional 0.8 h~1.5 h, and further optional 1 h.

In some embodiments of the present disclosure, prior to the step S41, i.e. said providing the composite material, a step of preparing the composite material is also included, and said preparing the composite material includes the following steps:

mixing 80~95 parts by mass of a hydrophilic material preheated to 70° C.~75° C. and part I initiator to obtain mixed liquor A, and mixing 5~20 parts by mass of solution containing at least one monomer and part II initiator to obtain mixed liquor B, where hydrophilic material includes micro-nano particles, the micro-nano particles include at least one of silicon dioxide and titanium dioxide, and the monomer includes allylic monomer with hydrophilic groups:

adding 5~20 parts by mass of the mixed liquor B into the mixed liquor A, and then adding part III initiator for a reaction at a temperature of 60° °C.~80° C. for 1 h~3 h to obtain reaction liquor C, where a total amount of the part I initiator, the part II initiator and the part III initiator is 0.02 part by mass: and mixing 70~95 parts by mass of the reaction liquor C and 5~30 parts by mass of polyvinyl alcohol aqueous solution (with concentration of 4%), to obtain the composite material.

When the composite material obtained by the preparation method according to the embodiments of the present disclosure is applied to the heat exchanger, an initial static contact angle of the surface of the heat exchanger can be less than 10°, which illustrates excellent hydrophilic effect. Besides, the preparation process of the composite material is environmentally friendly, with simple operation and low cost. A sol-based hydrophilic material of silane system which has excellent wettability with the aluminum-based substrate may be selected as the hydrophilic material in the composite material, as Si—O—Al bond can be formed between Si (silicon) and Al (aluminum), which improves the adhesion of the formed coating layer. The addition of the monomer polymer in the composite material further improves the compactness of the coating layer, improves the corrosion resistance of the coating layer to a certain extent, and in particularly, significantly improves the hydrophilic durability of the coating layer.

According to the embodiments of the present disclosure, the raw material for the preparation of the composite material includes hydrophilic material, which may be hydrophilic mixed sol. The hydrophilic material is 80~95 parts by mass, where typical but non limiting value may be, for example, 80 parts by mass, 82 parts by mass, 85 parts by mass, 88 parts by mass, 90 parts by mass, 92 parts by mass, 95 parts by mass, or any value in a range formed by any two of the above value.

In an embodiment of the present disclosure, the preparing the composite material includes the following steps.

Based on part by mass, 80~95 parts by mass of the hydrophilic material is heated to 70° ° C.~75° C., then 0.005 part by mass of tert-butyl hydroperoxide is added. Tert-butyl hydroperoxide can be used as an initiator to initiate the polymerization. The initiator can also be replaced by at least one of azodiisobutyronitrile, dibenzoyl peroxide, tert-amyl peroxide, di-tert-butyl peroxide, di-tert-amyl peroxide, dicumyl peroxide, ethyl 3,3-bis (tert-butylperoxy) butyrate, ethyl 3,3-bis (tert-amylperoxy) butyrate, tert-butyl peroxybenzoate, tert-amyl peroxybenzoate, tert-amyl peroxyacetate, 1,1'-bis (tert-butylperoxy)-3,3,5-trimethylcyclohexane, tert-butyl 2-ethylhexyl peroxide, and tert-amyl peroxide 2-ethylhexyl acid.

Then, a mixture of 5~20 parts by mass of hydroxyethyl methacrylate and 0.01 part by mass of tert-butyl hydroperoxide is dropped into the above system. Hydroxyethyl methacrylate is a monomer with a double chain, and hydroxyethyl methacrylate can also be replaced by a monomer selected from at least one of methacrylic acid, styrene, methyl methacrylate, methyl acrylate, butyl acrylate, hydroxypropyl acrylate, methacrylamide, and N-methacrylamide.

After dropping the above mixture, 0.005 part by mass of tert-butyl hydroperoxide is added into the system, and the system is kept in a 70° ° C. oil bath or water bath for 3 h (1~3 h), to obtain a mixed intermediate solution.

Note that a total amount of initiators is about 2 wt. % of that of the hydrophilic material and hydroxyethyl methacrylate, and the addition order of the initiators can be changed. For example, the initiators can be all added before dropping the hydroxyethyl methacrylate, or be mixed with hydroxyethyl methacrylate and added completely, or be added in stages before, during and after the dropping of hydroxyethyl methacrylate.

Note that in some embodiments, the mixed intermediate solution can also be used as the composite material, which is capable of forming a coating layer with excellent hydrophilic durability. However, to further improve the durability of the subsequent coating layer, the following operations are performed.

Based on part by mass, 70~95 parts by mass of the above mixed intermediate solution and 5~30 parts by mass of polyvinyl alcohol aqueous solution (with concentration of 4~8%) is ultrasonically mixed for 15 min, and mechanically stirred for 2 h, to obtain the final composite material.

According to the embodiments of the present disclosure, the source of the hydrophilic material which may be self-made or commercially available, is not specifically limited. The preparation of the hydrophilic material will be described in detail below.

In some embodiments, the hydrophilic material includes the following raw materials: 90~92 parts by mass of silica sol, 4~6 parts by mass of titanium dioxide sol and 3~5 parts by mass of pH regulator.

The method for preparing the hydrophilic material includes the following steps: mixing 90~92 parts by mass of silica sol and 4~6 parts by mass of titanium dioxide sol to obtain a mixed liquor, and adjusting a pH value of the mixed liquor to 2.5~3.5 with 3~5 parts by mass of a pH value regulator, and then stirring and reacting at 45° ° C.~55° ° C. for 3.5~5 h, to obtain the hydrophilic material.

The silica sol is 90~92 parts by mass, where typical but non limiting value may be, for example, 90 parts by mass, 90.5 parts by mass, 91 parts by mass, 91.2 parts by mass, 91.5 parts by mass, 92 parts by mass, or any value in a range formed by any two of the above value. When silica particles are prepared by sol-gel, there will be many Si—OH groups on the surface of silica particles, and the Si—OH groups have reactive group hydroxyl (—OH). The coating layer with excellent hydrophilicity can be obtained by the interaction among the particles. In addition, the hydrophilicity of the coating layer can be improved by making the content of silicon dioxide within the range.

The titanium dioxide sol is 4~6 parts by mass, where typical but non limiting value may be, for example, 4 parts by mass, 4.5 parts by mass, 4.8 parts by mass, 5 parts by mass, 5.2 parts by mass, 5.5 parts by mass, 5.8 parts by mass, 6 parts by mass, or any value in a range formed by any two of the above value. Titanium dioxide particles have amphoteric particles and photocatalytic properties, which are photo-induced super-hydrophilicity. Under illumination, the electrons in the valence band of $TiO_2$ are excited to the conduction band, and the electrons and holes migrate to the surface of $TiO_2$, and electron-hole pairs are generated on the surface. The electrons react with $Ti^{4+}$, and the holes react with surface bridge oxygen ions to form positive trivalent titanium ions and oxygen vacancies, respectively. At this time, the water in the air is dissociated and adsorbed in the oxygen vacancies, and becomes chemically adsorbed water (surface hydroxyl), which can further adsorb the water in the air to form a physical adsorption layer. That is, a highly hydrophilic micro-domain is formed around the trivalent titanium defect. When titanium dioxide particles are prepared by sol-gel, there will be many Ti—OH groups on the surface of titanium dioxide particles, and the Ti—OH groups have the reactive group hydroxyl (—OH), and can obtain the coating layer with excellent hydrophilicity.

The durability of the coating layer formed by silica sol is slightly worse than that of the coating layer formed by titanium dioxide sol, but the coating layer formed by silica sol has a better film-forming effect. On the contrary, titanium dioxide sol has poor film-forming effect, but the formed coating layer has strong durability. By adjusting the content proportion of silica sol and titanium dioxide sol, the advantages of silicon dioxide and titanium dioxide can be fully utilized, and the synergistic effect of them can be enhanced, the hydrophiclicity of the coating layer can be further improved, which results in good film-forming effect.

In some embodiments of the present disclosure, a part of the above 90~92 parts by mass of silica sol is commercially available, and the other part is obtained by using the preparation method according to the embodiments of the present disclosure, which is favorable to improve hydrophilicity and hydrophilic durability. In other embodiments of the present disclosure, the above 90~92 parts by mass of silica sol may be commercially available. Alternatively, in other embodiments of the present disclosure, the above 90~92 parts by mass of silica sol can be obtained by using the preparation method according to the embodiments of the present disclosure.

In some embodiments, among the above 90~92 parts by mass of silica sol, 34~36 parts by mass of silica sol are prepared by the preparation method according to the embodiments of the present disclosure, and the rest of the hydrophilic modified silica sol is commercially available.

The embodiments of the present disclosure have no restrictions on the sources and specific types of raw material such as the above titanium dioxide sol and pH regulator, which can be flexibly selected according to actual needs by those skilled in the art, as long as the purpose of the present disclosure is not limited. For example, each raw material well known to those skilled in the art, both that commercially available and that prepared by using a preparation method well known to those skilled in the art, can be used.

In some embodiments, the preparation method of the above prepared silica sol includes the following steps:

Based on part by mass, 36~40 parts by mass of silane precursor and 50~56 of solvent are mixed uniformly at 45° C.~55° C., then 2~4 parts by mass of water and 0.5~1.5 parts by mass of surfactant are added and mixed uniformly, then 1~2 parts by mass of acid and 2~4 parts by mass of water are added for a reaction of 22 h~24 h to obtain hydrophilic modified silica sol. The silane precursor may be, for example, 36 parts by mass, 37 parts by mass, 38 parts by mass, 39 parts by mass, 40 parts by mass, or the like. The solvent may be, for example, 50 parts by mass, 51 parts by mass, 52 parts by mass, 53 parts by mass, 54 parts by mass, 55 parts by mass, 56 parts by mass, or the like. The water may be, for example, 1 part by mass, 1.5 parts by mass, 2 parts by mass, 2.5 parts by mass, 3 parts by mass, 3.5 parts by mass, 4 parts by mass, or the like. The surfactant may be, for example, 0.5 part by mass, 0.8 part by mass, 1 part by mass, 1.2 parts by mass, 1.5 parts by mass, or the like. The acid may be, for example, 1 part by mass, 1.2 parts by mass, 1.5 parts by mass, 1.6 parts by mass, 1.8 parts by mass, 2 parts by mass, or the like. The mixing temperature may be, for example, 45° C., 46° C., 48° C., 50° C., 52° C., 54° C., 55° C., or the like. The reaction time may be, for example, 22 h, 22.5 h, 23 h, 23.5 h, 24 h, or the like.

The specific types of the above silane precursor can be various under the requirements such as hydrophilic property of the hydrophilic mixed sol. In some embodiments, the silane precursor includes 30~32 parts by mass of γ-Glycidyl ether oxypropyl trimethoxysilane (abbreviated as KH-560) and 6~8 parts by mass of tetraethyl orthosilicate. For example, KH-560 may be 30 parts by mass, 31 parts by mass, 32 parts by mass, or the like. The tetraethyl orthosilicate may be, for example, 6 parts by mass, 7 parts by mass, 8 parts by mass, or the like.

In addition, in other embodiments, the silane precursor is not limited to the ones listed above, and other types of silane precursors can also be used under the requirements such as hydrophilic property of the hydrophilic mixed sol. For example, hexamethyldisilazane, chlorosilane, or the like, which will not be described in detail here.

Using a mixture of a certain content of KH-560 and tetraethyl orthosilicate as the silane precursor is more helpful to obtain the silica sol with excellent hydrophilicity, which has excellent hydrophilicity and durability. The specific types of solvent, surfactant, and acid can be various under the requirements such as hydrophilic property of the hydrophilic mixed sol.

In some embodiments, the solvent includes alcohol solvent. Further, the alcohol solvent includes alcohol-based solvent with 1~10 carbon atoms, preferably an alcohol-based solvent with 1~8 carbon atoms, and more preferably an alcohol-based solvent with 1~4 carbon atoms. Further, in some embodiments, the solvent is any one of, or a mixture of any two or more in any ratio of methanol, ethanol and isopropanol which have vast source and low cost, and is easy to obtain.

In some embodiments, the surfactant includes, but is not limited to, at least one of sodium dodecyl sulfate, sodium dodecyl sulfonate, sodium dodecyl benzene sulfonate, and hexadecyl benzene sulfonic acid, which have vast source, low cost and excellent applying effect. Further, in some embodiments, the surfactant is sodium dodecyl sulfate. In some embodiments, the acid includes, but is not limited to, at least one of formic acid and acetic acid. Further, in some embodiments, the acid is formic acid.

In some specific embodiments, the preparing method of the above prepared silica sol includes the following steps: 31 parts by mass of KH-560, 7 parts by mass of tetraethyl orthosilicate and 54 parts by mass of absolute ethanol are mechanically stirred and uniformly mixed under a water bath condition of 45° C.~55° C. to obtain a mixture. 3 parts by mass of water and 1 part by mass of sodium dodecyl sulfate are mixed uniformly and added into the mixture. Then, 1 part by mass of formic acid and 3 parts by mass of water are added into the mixture, and mixed uniformly, and the above reaction conditions are kept unchanged for about 24 h, to obtain the silica sol.

The equation or reaction mechanism involved in the preparation of the above silica sol can be as follows:

1) Hydrolysis condensation of tetraethyl orthosilicate:
$Si(OCH_2CH_3)_4 + 2H_2O \rightarrow SiO_2 + 4C_2H_5OH$:
2) Hydrolysis of KH560: $R—Si(OCH_3)_3 + 3H_2O \rightarrow R—Si(OH)_3 + CH_3OH$:
Polycondensation of KH560: $R—Si(OH)_3 + R—Si(OH)_3 \rightarrow R—Si(OH)_2—O—Si(OH)_2—R + H_2O$:
$R—Si(OH)_3 + R—Si(OCH_3)_3 \rightarrow R—Si(OH)_2—O—Si(OH)_2—R + CH_3OH$, where R represents the long chain group $—(CH_2)_3—O—CHOCH_2$:
3) Condensation of KH560 with silanol group: $R—Si(OH)_3 + Si(OH)_4 + R—Si(OH)_2—O—Si(OH)_3 + H_2O$.

The silica sol prepared by the embodiments of the present disclosure contains many hydroxyl (—OH) hydrophilic groups, which make the sol shows hydrophilicity, and form a spatial network structure by dehydration condensation between hydroxyl groups at the same time. Thus, the dispersed nanoparticles, such as silicon dioxide and titanium dioxide, which are further added to the hydrophilic mixed sol are filled into the spatial network structure, to form a stable sol system, that is, a hydrophilic mixed sol. The sol of the hydrophilic mixed sol can be combined with —OH in the metal substrate and perform dehydration condensation to form covalent bonds. After the film is formed, it can protect the metal substrate to achieve hydrophilic and antiseptic effects.

The pH regulator includes organic acid or inorganic acid under the requirements such as hydrophilic property of the hydrophilic mixed sol. In some embodiments, the pH regulator is formic acid.

In addition, the above prepared hydrophilic modified silica sol contains nano-silica particles, and has excellent dispersibility. And the commercially available silica sol that in micron and submicron levels can be adopted. The combination of silica particles with different particle sizes improves the surface morphology of the coated coating layer, and increases the surface energy and hydrophilicity of the coating layer.

In other embodiments provided by the present disclosure, the composite material of the present disclosure can also be applied to non-heat exchanger products, such as heat pumps and water heaters. The composite material according to the embodiments of the present disclosure can be applied to other products that need to improve hydrophilic performance and/or hydrophilic durability.

To fully illustrate that the composite material according the present disclosure can improve the hydrophilicity and hydrophilic durability, and to facilitate understanding of the present disclosure, several sets of experimental verification have been carried out. The present disclosure will be further described below in combination with Examples and Comparative Examples. Those skilled in the art will understand that only some examples are described in the present disclosure and any other suitable specific examples fall within the scope of the present disclosure.

Example 1 (the Sample is a Plate)

(1) 31 parts by mass of KH560, 7 parts by mass of tetraethyl orthosilicate and 54 parts by mass of absolute ethanol were mechanically and uniformly stirred in a water bath at 50° ° C.: 3 parts by mass of water and 1 part by mass of sodium dodecyl sulfate were uniformly mixed and added into the system, then 1 part by mass of formic acid and 3 parts by mass of water were dropwise added into the system and mixed uniformly, and the above reaction conditions were kept unchanged for 24 h, to obtain silica sol.

(2) 35 parts by mass of the above silica sol, 56 parts by mass of the commercially available silica sol and 5 parts by mass of the commercially available titanium dioxide sol were mixed with 4 parts by mass of formic acid to adjust the pH to about 3.0, and then stirred uniformly in a water bath at 50° C. for a reaction for 4 h, to obtain a hydrophilic material.

(3) 85 parts by mass of the above hydrophilic material were heated to 70° ° C., 0.005 parts by mass of tert-butyl hydroperoxide was added, then a mixture of 15 parts by mass of hydroxyethyl methacrylate and 0.01 part by mass of tert-butyl hydroperoxide was dripped, and after dripping, 0.005 part by mass of tert-butyl hydroperoxide was added for a reaction in an oil bath or a water bath at 70° ° C. for 3 h to obtain sol M.

(4) 80 parts by mass of the above sol M and 20 parts by mass of polyvinyl alcohol aqueous solution (concentration: 4%) were ultrasonically mixed for 15 min, and mechanically stirred for 2 h, to obtain the composite material.

(5) The plate was taken as the sample. The plate was sandblasted by white corundum with 120 meshes once with a sandblasting angle of 45° and a distance between the spray gun and the plate of 50 mm, and then sprayed with absolute ethanol and dried at 40° C. for standby.

(6) The sample obtained in the step (5) was dip-coated with the composite material prepared in the above step (4) for 2 min once: and cured at 200° ° C. for 10 min, to obtain the sample with a coating after dip-coating.

Example 2 (the Sample is a Plate)

Example 2 differs from Example 1 as follows:
In Example 2, in step (4), 90 parts by mass of the above sol M and 10 parts by mass of polyvinyl alcohol aqueous solution (concentration: 4%) were ultrasonically mixed for 15 min, and mechanically stirred for 2 h, to obtain the composite material.

The other steps were the same as those in Example 1.

Example 3 (the Sample is a Plate)

In Example 3, the composite material and the sample were prepared in the same manner as in Example 1, except for the preparation of the hydrophilic material.

Example 3 differs from Example 1 as follows: in step (1), based on part by mass, 32 parts by mass of KH560, 8 parts by mass of tetraethyl orthosilicate and 53 parts by mass of absolute ethanol were mechanically and uniformly stirred in a water bath at 50° C.: 2.5 parts by mass of water and 0.5 part by mass of sodium dodecyl sulfate were mixed uniformly and added to the system, then 1.5 parts by mass of formic acid and 2.5 parts by mass of water were dripped to the system and mixed uniformly, and the above reaction conditions were kept unchanged for 24 h to obtain silica sol. The other steps were the same as those in Example 1.

Example 4 (the Sample is a Heat Exchanger)

Example 4 differs from Example 1 as follows: in step (5) of Example 4, the plate was replaced by a heat exchanger as the sample. The other steps were the same as those in Example 1.

Example 5 (the Sample is a Plate)

Example 5 differs from Example 1 as follows: Example 5 includes steps (1), (2), (3) and (5), but no step (4). Correspondingly, in the step of preparing the sample, the sample obtained in the step (5) was dip-coated with the sol M prepared in step (3) of Example 1 for 2 min once, and cured at 200° ° C. for 10 min, to obtain the sample with a coating after dip-coating.

Comparative Example 1

Comparative Example 1 differs from Example 1 as follows: Comparative Example 1 includes steps (1), (2) and (5), but not step (3) and (4). Correspondingly, in the step of preparing the sample, the sample obtained in the step (5) was dip-coated with the hydrophilic material prepared in step (2) of Example 1 for 2 min once, and cured at 200° ° C. for 10 min, to obtain the sample with a coating Comparative Example 2

Comparative Example 2 differs from Example 1 in that the preparation process of the composite material in Comparative Example 2 is different from that in Example 1. Specifically:

(1) Based on part by mass, 31 parts by mass of KH560, 7 parts by mass of tetraethyl orthosilicate and 54 parts by mass of absolute ethanol were mechanically stirred in a water bath at 50° ° C. uniformly: 3 parts by mass of water and 1 part by mass of sodium dodecyl sulfate were mixed uniformly and added to the system, then 1 part by mass of formic acid and 3 parts by mass of water were dripped to the system and mixed uniformly, and the above reaction conditions were kept unchanged for 24 h to obtain silica sol.

(2) 35 parts by mass of the above silica sol, 56 parts by mass of the commercially available silica sol and 5 parts by mass of the commercially available titanium dioxide sol were mixed with 4 parts by mass of formic acid to adjust the pH value to about 3.0, and stirred uniformly in a water bath at 50° C. for a reaction for 4 h to obtain an intermediate solution.

(3) Based on part by mass, 10 parts by mass of acrylic resin and 90 parts by mass of intermediate solution were mixed uniformly to obtain the composite material.

In Comparative Example 2, the heat exchanger was taken as the sample. The heat exchanger was sandblasted by white corundum with 120 meshes. The sandblasting process and coating process were similar to those in Example 1, and thereby would not be repeated here.

Performance Test

1. Hydrophilic Property Test (Contact Angle Test)

A contact angle measuring instrument, which adopts the image contour analysis method to measure the contact angle of the sample according to the optical imaging principle, is adopted. The contact angle refers to an angle formed between two tangents of gas-liquid interface and solid-liquid interface when liquid phase is sandwiched between the two tangents of gas-liquid interface and solid-liquid interface, and located at the three-phase (solid-liquid-gas) junction point on a solid surface after a drop of liquid is dropped on a horizontal plane of the solid.

Before the test, the contact angle measuring instrument and a computer connected thereto were turned on, and a testing software was operated.

A sample was put on a horizontal table, and the amount of droplet was adjusted with a microliter syringe. The volume of the droplet as generally about 1 μL, and the droplet was formed on the needle. A knob was rotated to move the table up, so that the surface of the sample was in contact with the droplet, and then the table was moved down, so that the droplet can be left on the sample.

The contact angle of the area was obtained by test and data analysis through the testing software. Five different points were taken on the samples in each Example and each Comparative Example to test and get an average value, and then the average value was recorded as the contact angle of the samples in the Example and the Comparative Example.

The test results of the above contact angles showed that initial contact angles of the surfaces of the samples in Examples 1 to 4 were all less than 10°, which indicated that the hydrophilic property of the coating layer formed on the sample surface by the composite material of the present disclosure was relatively excellent, which was conducive to accelerate the discharge of condensed water in confined space.

2. Hydrophilic Durability Test 2.1 Hot and Cold Alternating Test

The samples in Example 1, Example 4, Example 5, Comparative Example 1 and Comparative Example 2 were put into a hot and cold alternating box, and a temperature range of −40° ° C.~120° ° C. was recorded as one cycle. After a certain number of cycles, the samples were taken out, and dried by blowing for the contact angle test, to obtain the corresponding contact angles of the coating layer. The test results are shown in Table 1.

TABLE 1

| Hot and cold alternating test results (I) | | | | | | |
|---|---|---|---|---|---|---|
| | Number of hot and cold alternating/number of times | | | | | |
| Item | 0 | 120 | 240 | 360 | 480 | 600 |
| Example 1 | 5.611° | 5.594° | 16.842° | 37.781° | 50.303° | 86.703° |
| Example 4 | <10° | 22.318° | 24.597° | 51.022° | \ | \ |

TABLE 1-continued

| Hot and cold alternating test results (I) | | | | | | |
|---|---|---|---|---|---|---|
| | Number of hot and cold alternating/number of times | | | | | |
| Item | 0 | 120 | 240 | 360 | 480 | 600 |
| Example 5 | 6.804° | 6.066° | 11.649° | 31.683° | 53.441° | \ |
| Comparative Example 2 | <10° | 18.932° | 35.524° | 73.207° | \ | \ |

TABLE 2

| Hot and cold alternating test results (II) | | | |
|---|---|---|---|
| Item/Cycle | 0 | 100 | 200 |
| Comparative Example 1 | <10° | 49.369° | >60° |

The test samples corresponding to Example 1 and Example 5 were all plates. It can be seen from data in Table 1, after 480 thermal cycling tests, the contact angles on the surface of the coating layer of the samples in Example 1 and Example 5 were about 50°, which indicated that the samples still showed excellent hydrophilicity. After 600 thermal cycles, the contact angle on the surface of the coating layer of the sample in Example 1 gradually increased, and the hydrophilic property deteriorated. The sample corresponding to Example 4 was a heat exchanger. After 240 thermal cycling tests, the contact angle on the surface of the coating layer of the sample was about 24°, which indicated that the sample showed excellent hydrophilic performance. After 360 thermal cycles, the contact angle on the surface of the coating layer of the sample was about 51°, and the durability of the coating layer slightly deteriorated, since the surface of the heat exchanger was not as flat as the plate, and the heat exchanger had more irregular structures, such as arc surfaces. Correspondingly, it posed a great challenge to the durability of the coating layer. Therefore, the durability of the coating layer on the sample surface of the heat exchanger type was slightly weaker than that of the coating layer on the sample surface of the plate type.

In Comparative Example 1, the composite material was mainly a silane-based hydrophilic sol material. Although the initial contact angle of the coating layer shows excellent hydrophilicity, the contact angel increased to about 50° after only 100 thermal cycles. After 200 thermal cycling tests, the coating state was poor, and the hydrophilicity of the coating layer rapidly increased to about 60°, which led to difficulty in maintaining excellent hydrophilic performance. In Comparative Example 2, the durability of the coating layer was improved to a certain extent by adding acrylic resin into the hydrophilic sol of the silane system of the composite material. However, after 360 thermal cycling tests, the contact angle on the surface of the coating layer had reached to above 70°, and the durability of the coating layer was relatively poor comparing with that in Example 1, Example 4 and Example 5. In addition, in practice, due to the existence of acrylic resin, the formed coating layer had a pungent sour odor, and the user experience was poor during the process of producing and using.

2.2 Flow Test

The heat exchanger samples of Example 2, Example 3, Example 5 and Comparative Example 1 were immersed in flowing water. After a certain time, the samples were taken out and dried by blowing for the contact angle test. The contact angles at a certain time were recorded. The test results are shown in Table 1 and Table 2, respectively.

TABLE 3

Flow test results (I)

| Item | \multicolumn{7}{c}{Flow test time} |
|---|---|---|---|---|---|---|---|
| | 0 h | 24 h | 48 h | 72 h | 144 h | 240 h | 312 h |
| Example 2 | <10° | 45.271° | 43.090° | 32.982° | 40.014° | 38.529° | 22.983° |
| Example 3 | <10° | 48.174° | 43.433° | 37.186° | 44.159° | 32.167° | 21.438° |
| Example 5 | <10° | 34.031° | 29.114° | 28.61° | 22.756° | 13.441° | 涂层脱落 |

| Item | \multicolumn{7}{c}{Flow test time} |
|---|---|---|---|---|---|---|---|
| | 384 h | 480 h | 576 h | 672 h | 840 h | 912 h | 984 h |
| Example 2 | 13.509° | 20.162° | 36.106° | 31.167° | 42.12° | 41.793° | 33.776° |
| Example 3 | 19.406° | 20.553° | \ | \ | \ | \ | \ |
| Example 5 | \ | \ | \ | \ | \ | \ | \ |

TABLE 4

Flow test result (II)

| Item | \multicolumn{5}{c}{Flow test time} |
|---|---|---|---|---|---|
| | 0 h | 24 h | 48 h | 72 h | 96 h |
| Comparative Example 3 | 21.406° | 50.927° | 51.433° | 56.765° | 58.394° |

For three examples, the processing steps for the samples were similar. The difference was that polyvinyl alcohol was added to the formulation of the composite materials in Example 2 and Example 3, while polyvinyl alcohol was not contained in the formulation of the composite material in Example 5.

It can be seen from Table 3 and Table 4 that the coating layer of the sample in Example 5 fell off after 312 h of flow test, while the hydrophilic contact angles of the surfaces of the coating layers of the samples in Example 2 and Example 3 were kept at about 20° after 480 h of flow test, and the hydrophilic contact angle of the coating layer in Example 2 was kept at about 33° after 984 h of flow test, which indicated that the hydrophilic durability of the coating layer was excellent. Further, the hydrophilic durability of the coating layers in Example 2 and Example 3 were better than that of the coating layer in Example 5, which indicated that adding polyvinyl alcohol to the formulation of the composite material can make the durability of the coating more excellent in the flow test.

2.3 Wetting-Drying Cycle Test

The heat exchanger samples in Example 4 and Comparative Example 2 were immersed into water, and after a preset time, the samples were taken out and dried for the contact angle test. This process was recorded as one cycle. Then the samples were immersed into water again, and after a preset time, the samples were dried. During the test, the contact angles of the coating layer corresponding to the sample after a certain number of cycle times were recorded. The test results are shown in Table 5.

TABLE 5

Wetting-drying cycle test results

| Item | \multicolumn{11}{c}{Number of wetting-drying/number of times} |
|---|---|---|---|---|---|---|---|---|---|---|---|
| | 0 | 96 | 168 | 240 | 336 | 408 | 504 | 648 | 744 | 840 | 1008 |
| Comparative Example 2 | <10° | 36.481° | 43.113° | 43.103° | 38.932° | 41.513° | 40.789° | 42.203° | 37.514° | | |
| Example 4 | <10° | 36.297° | 31.441° | 26.726° | 31.062° | 21.037° | 16.894° | 12.341° | 20.701° | 38.021° | 25.233° |

It can be seen from the data in Table 5 that the contact angle of the coating layer on the heat exchanger sample in Example 4 was 20.701° after a wetting-drying cycle test of 744 times, and the contact angle of the coating layer in Example 4 was 25.233° after a wetting-drying cycle test of 1008 times. The heat exchanger sample in Example 4 showed excellent hydrophilic durability. After a wetting-drying cycle test of 96 times, the hydrophilic contact angle of the coating layer on the heat exchanger sample in Comparative Example 2 was similar to that in Example 4. However, as the number of times of the wetting-drying cycle test increased, the hydrophilic contact angle of the coating layer in Comparative Example 2 increased greatly. After a wetting-drying cycle test of 744 times, the contact angle of the coating layer in Comparative Example 2 was 37.514°, that is, the hydrophilic contact angle was significantly greater than that in Example 4, which indicated that the hydrophilic durability of the coating layer corresponding to Example 4 of the present disclosure was more excellent than that in Comparative Example 2.

In the description of the present disclosure, referred terms "one embodiment", "some embodiments", "illustrative embodiments", "example", "specific example", or "some examples", etc., means that the specific features, structures, materials or characteristics described in connection with the embodiments or examples are included in at least one embodiment or example of the present disclosure. In the specification, the schematic representations of the above terms do not necessarily refer to the same embodiment or example. Furthermore, the specific features, structures, materials or characteristics described may be combined in a suitable manner in any one or more embodiments or examples. The location words such as "up", "down", "inner" and "outer" described in the embodiments of the present disclosure are described from the angles shown in the drawings, and should not be construed as limitations on the embodiments of the present disclosure.

Although the embodiments of the present disclosure have been shown and described, those skilled in the art can understand that various changes, modifications, substitutions and variants can be made to the embodiments without departing from the principles and purposes of the present disclosure, and the scope of the present disclosure is limited by the claims and their equivalents.

What is claimed is:

1. A heat exchanger, comprising:
   a collecting pipe;
   a fin;
   a plurality of heat exchange tubes; and
   a coating layer,
   wherein each of the plurality of heat exchange tubes is fixed to the collecting pipe, and an inner cavity of each heat exchange tube is communicated with an inner cavity of the collecting pipe, and at least part of the fin is retained between two adjacent heat exchange tubes,
   wherein the coating layer is coated on at least part of an outer surface of at least one of the collecting pipe, the plurality of heat exchange tubes, and the fin, the coating layer comprises particles in micron, submicron or nano level and a polymer obtained by polymerizing monomers, the particles in micron, submicron or nano level comprise silicon dioxide and/or titanium dioxide, and the monomers corresponding to the polymer comprise allylic monomers with hydrophilic groups,
   wherein at least one of the collecting pipe, the fin, and the plurality of heat exchange tubes comprises a metal substrate, an outer surface of the metal substrate comprising an uneven rough surface, a roughness of the uneven rough surface defined as Ra, wherein the roughness of the uneven rough surface satisfies a relationship: $0.5\ \mu m \leq Ra \leq 10\ \mu m$, and
   wherein at least part of the coating layer is coated on the uneven rough surface.

2. The heat exchanger according to claim 1, wherein the allylic monomers comprise at least one of hydroxyethyl methacrylate, methacrylic acid, methyl methacrylate, methyl acrylate, butyl acrylate, hydroxypropyl acrylate, methacrylamide, acrylamide and N-methacrylamide.

3. The heat exchanger according to claim 2, wherein the plurality of heat exchange tubes are arranged along a length direction of the collecting pipe; a dimension in a width direction of each heat exchange tube is larger than a dimension in a thickness direction of each heat exchange tube, and the width direction of the plurality of heat exchange tubes and the length direction of the collecting pipe are not co-directional.

4. The heat exchanger according to claim 2, wherein the fin is corrugated along a length direction of the plurality of heat exchange tubes; the fin comprises a plurality of fin units arranged along the length direction of the plurality of heat exchange tubes, and a wave crest or a wave trough in a waveform corresponds to a location where two adjacent fin units are connected to each other to form the fin, and the fin is fixed to one of the plurality of heat exchange tubes at a location where adjacent fin units are connected to each other.

5. The heat exchanger according to claim 2, wherein each of the plurality of heat exchange tubes is provided with a plurality of channels for flowing fluid, the inner cavity of each heat exchange tube comprising the plurality of channels, each of the plurality of channels being in communication with the inner cavity of the collecting pipe, and each of the plurality of channels extending along a same direction.

6. The heat exchanger according to claim 1, wherein the coating layer further comprises at least one of polyvinyl alcohol and polyethylene glycol.

7. The heat exchanger according to claim 1, wherein a weight per unit area of the coating layer is $15\ g/m^2 \sim 20\ g/m^2$.

8. A processing method of a heat exchanger, comprising:
   providing a composite material and a heat exchanger, wherein the composite material comprises particles in micron, submicron or nano level and a polymer obtained by polymerizing monomers, the particles in micron, submicron or nano level comprising silicon dioxide and/or titanium dioxide, and the monomers corresponding to the polymer comprise allylic monomers with hydrophilic groups; and the heat exchanger comprises a collecting pipe, a fin, and a plurality of heat exchange tubes, each of the plurality of heat exchange tubes being fixed to the collecting pipe, and an inner cavity of each of the plurality of heat exchange tubes being in communication with an inner cavity of the collecting pipe, and at least part of the fin is retained between two adjacent heat exchange tubes; and
   coating the composite material on at least part of an outer surface of at least one of the collecting pipe, the plurality of heat exchange tubes, and the fin, and curing the composite material,
   wherein at least one of the collecting pipe, the fin, and the plurality of heat exchange tubes comprises a metal substrate, an outer surface of the metal substrate comprising an uneven rough surface, a roughness of the uneven rough surface defined as Ra, wherein the roughness of the uneven rough surface satisfies a relationship: $0.5\ \mu m \leq Ra \leq 10\ \mu m$, and
   wherein at least part of the composite material is coated on the uneven rough surface.

9. The processing method according to claim 8, wherein the composite material further comprises polyvinyl alcohol and/or polyethylene glycol.

10. The processing method according to claim 8, further comprising:
    sandblasting the heat exchanger to form an uneven rough surface on at least part of an outer surface of a metal substrate corresponding to at least one of the collecting pipe, the fin, and the plurality of heat exchange tubes; and
    cleaning and drying the sandblasted heat exchanger.

11. The processing method according to claim 10, further comprising:

sandblasting at least part of the outer surface the metal substrate corresponding to at least one of the collecting pipe, the fin, and the plurality of heat exchange tubes by abrasives with a particle size ranging from 30 meshes to 280 meshes.

12. The processing method according to claim 8, further comprising:

applying a dip-coating to the heat exchanger with the composite material, wherein a count of the dip-coating is greater than or equal to 1, a duration of the dip-coating is greater than or equal to 30 seconds; a temperature of a curing after the dip-coating is 150° C.~240° C., and a duration of the curing is greater than or equal to 5 minutes.

13. The processing method according to claim 8, further comprising preparing the composite material, wherein preparing the composite material comprises:

mixing 80~95 parts by mass of a hydrophilic material preheated to 70° C.~75° C. and a part I initiator to obtain a mixed liquor A, and mixing 5~20 parts by mass of a solution containing at least one monomer and a part II initiator to obtain a mixed liquor B; wherein the hydrophilic material comprises particles in micron, submicron or nano level, the particles in micron, submicron or nano level comprising at least one of silicon dioxide and titanium dioxide, and the at least one monomer comprising an allylic monomer with hydrophilic groups;

dripping 5~20 parts by mass of the mixed liquor B into the mixed liquor A, and adding a part III initiator for a reaction at a temperature of 60° C.~80° C. for 1~3 h to obtain a reaction liquor C, wherein a total amount of the part I initiator, the part II initiator and the part III initiator is 0.02 part by mass; and mixing 70~95 parts by mass of the reaction liquor C and 5~30 parts by mass of a polyvinyl alcohol aqueous solution to obtain the composite material.

14. The processing method according to claim 13, further comprising:

mixing 90~92 parts by mass of silica sol and 4~6 parts by mass of titanium dioxide sol to obtain a mixed liquor, and adjusting a pH value of the mixed liquor to 2.5~3.5 with 3~5 parts by mass of a pH value regulator, and then stirring for a reaction at 45° C.~55° C. for 3.5~5 h, to obtain the hydrophilic material.

15. A heat exchanger, comprising:

a collecting pipe extending along a horizontal direction, the collecting pipe defining a first inner cavity;

a plurality of heat exchange tubes extending along a vertical direction perpendicular to the horizontal direction, each of the plurality of heat exchange tubes being provided with a plurality of second inner cavities arranged along a transverse direction perpendicular to both of the horizontal direction and the vertical direction, each of the plurality of heat exchange tubes connecting with the collecting pipe, each of the plurality of second inner cavities being in fluid communication with the first inner cavity; and a coating layer coated on at least part of an outer surface of at least one of the collecting pipe and the plurality of heat exchange tubes;

wherein the coating layer comprises particles in micron, submicron or nano level and a polymer obtained by polymerizing monomers, the particles in micron, submicron or nano level comprise silicon dioxide and/or titanium dioxide, and the monomers corresponding to the polymer comprise allylic monomers with hydrophilic groups, wherein at least one of the collecting pipe and the plurality of heat exchange tubes comprises a metal substrate, an outer surface of the metal substrate comprising an uneven rough surface, a roughness of the uneven rough surface defined as Ra, wherein the roughness of the uneven rough surface satisfies a relationship: 0.5 µm≤Ra≤10 µm, and wherein at least part of the coating layer is coated on the uneven rough surface.

16. The heat exchanger according to claim 15, further comprising a plurality of fins each being sandwiched between two adjacent heat exchange tubes, each fin extending in a wave shape along the vertical direction; wherein at least part of an outer surface of each fin is coated with the coating layer.

17. The heat exchanger according to claim 16, wherein the outer surface of each fin comprises a covered area and a non-covered area, the covered area is coated with the coating layer, and the non-covered area is not in contact with the coating layer.

18. The heat exchanger according to claim 16, wherein each fin has a plurality of wave crest portions and a plurality of wave trough portions, each of the plurality of wave crest portions and the plurality of wave trough portions being alternately arranged along the vertical direction, and each of the plurality of wave crest portions and the plurality of wave trough portions connecting with two flat faces of two adjacent heat exchange tubes;

wherein the coating layer is coated on the plurality of wave crest portions and the plurality of wave trough portions.

19. The heat exchanger according to claim 16, wherein all outer surfaces of each of the plurality of fins and the plurality of heat exchange tubes are covered with the coating layer, the heat exchanger is a microchannel heat exchanger, at least one of the plurality of fins is a louvered fin, and at least one of the plurality of heat exchange tubes is a microchannel flat tube.

20. The heat exchanger according to claim 15, wherein the allylic monomers comprise at least one of hydroxyethyl methacrylate, methacrylic acid, methyl methacrylate, methyl acrylate, butyl acrylate, hydroxypropyl acrylate, methacrylamide, acrylamide and N-methacrylamide, and wherein the coating layer further comprises at least one of polyvinyl alcohol and polyethylene glycol.

\* \* \* \* \*